Figure 1:
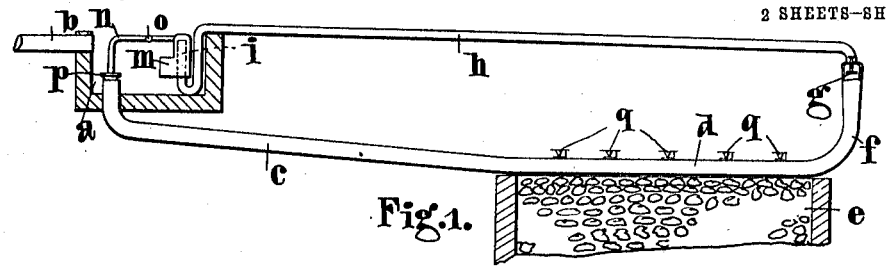

R. B. BROWN.
APPARATUS FOR DISTRIBUTING SEWAGE OR OTHER LIQUIDS.
APPLICATION FILED MAR. 21, 1910.

1,035,414.

Patented Aug. 13, 1912.

2 SHEETS—SHEET 1.

R. B. BROWN.
APPARATUS FOR DISTRIBUTING SEWAGE OR OTHER LIQUIDS.
APPLICATION FILED MAR. 21, 1910.

1,035,414.

Patented Aug. 13, 1912.

2 SHEETS—SHEET 2.

Witnesses:
John Frew

Inventor:
Robert Barrington Brown,
by R.W. Barkley,
atty.

UNITED STATES PATENT OFFICE.

ROBERT BARRINGTON BROWN, OF FISHERGATE, ENGLAND.

APPARATUS FOR DISTRIBUTING SEWAGE OR OTHER LIQUIDS.

1,035,414.  Specification of Letters Patent.  Patented Aug. 13, 1912.

Application filed March 21, 1910. Serial No. 550,749.

*To all whom it may concern:*

Be it known that I, ROBERT BARRINGTON BROWN, a subject of the King of Great Britain and Ireland, and residing at 2 Chelmsford Place, Fishergate, in the county of York, England, have invented a certain new and useful Apparatus for Distributing Sewage or other Liquids, of which the following is a specification.

My invention relates mainly to apparatus for distributing or spraying sewage on filter beds by means of a perforated pipe or series of perforated pipes supplied with the sewage to be distributed by a collecting tank or other receptacle. These pipes are usually arranged so that the jet issues vertically from each perforation and is then deflected by a suitably fixed inverted cone or other form of spreader so as to fall at or about the circumference of a circle, of which the nozzle or perforation is the center. My invention is applicable however to distributing pipes perforated and arranged in any other way. As the available head or pressure of the sewage to be distributed is usually small, considerable trouble is caused by the perforations or nozzles becoming more or less choked and requiring constant attention and cleaning by manual labor.

The object of my invention is to make these orifices practically self-cleansing, also to achieve a more regular and systematic distribution over the whole of the area intended to be covered by each jet, and further with any given head of liquid to distribute or spray the sewage over a more extended area than attained in the ordinary system. As the maximum available head or energy of the liquid to be distributed is only required when the jet is discharging on to the filter at the maximum radius or distance from the nozzle or orifice, a correspondingly smaller head is sufficient to distribute over the intermediate areas nearer the nozzle, and by means of my invention, I utilize this surplus head or energy of the liquid intended to be distributed over the intermediate areas in order to force another portion of the liquid over an extended area beyond that which the jet would normally cover with a given head or pressure.

The essential feature of my invention lies in intermittently producing a temporary increased head or pressure in the distributing or spray pipes, over and above that due to the ordinary static head of the liquid being fed to the distributing system by utilizing the momentum of the flowing liquid. This momentum may be used to effect the increase of pressure either by arranging that the flow is suddenly retarded or by arranging that the liquid is forced into a vertical pipe to an increased height, creating a head which is then adapted to act on the distributing pipe or pipes.

Figure 2:
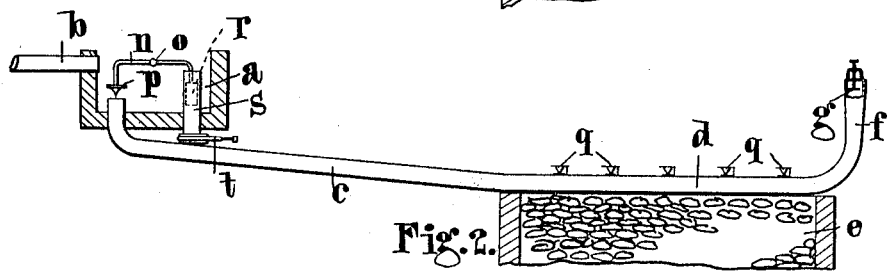
Figure 5:
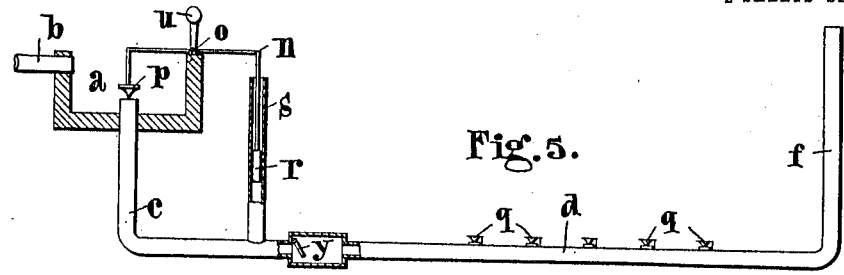
Figure 7:
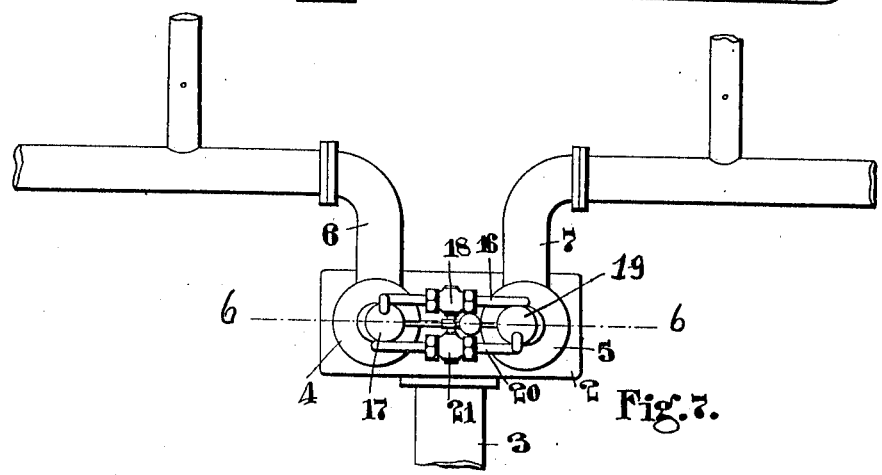
Figure 6:
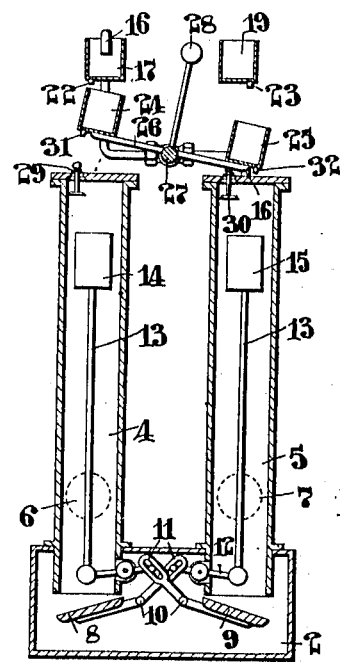

Referring now to the accompanying drawings which illustrate several forms of apparatus constructed according to the invention, and in which corresponding parts are designated by the same characters; Figures 1, 2, 2ª and 3 are sectional elevations of various forms of apparatus arranged according to the invention; Fig. 4 is a plan view of the apparatus shown in Fig. 3; Figs. 5 and 6 are sectional elevations of still further forms; and Fig. 7 is a plan view of the apparatus shown in Fig. 6.

Referring first to the apparatus shown in Fig. 1, $a$ represents a tank or receptacle to which the sewage or other liquid to be distributed is conveyed by a pipe, $b$. From the bottom of this tank leads a discharge pipe, $c$, connected to the distributing pipe, $d$, which is arranged over the filter bed, $e$. The pipe, $d$, terminates in a short rising vessel or pipe, $f$, hereinafter referred to as the "pulse" or "momentum" pipe, which may in some cases be of greater or of less sectional area than the pipe, $d$. The top of the "pulse" pipe, $f$, is preferably lower than the liquid level in the tank, $a$, and is fitted with a ball or clack valve, $g$. From above this valve an air pipe, $h$, leads back to the tank, $a$, and terminates in a vertical portion, $i$, having an open end well above the liquid level in the tank. An inverted hollow member or dome, $m$, is arranged to cover the end of the pipe, $i$, and dips into the liquid. This hollow member is connected to one end of a lever, $n$, which is pivoted at $o$ and carries at its other end a valve $p$, adapted to control the inlet of the pipe, $c$. The level of the liquid in the tank $a$ is mantained at an approximately constant head and above the valve $p$. The pipe, $d$, is provided with perforations or nozzles above which spraying cones, $q$, may be arranged as above mentioned. In the operation of the apparatus the valve $p$, being open the pipes, $c$ and $d$, are filled with liquid which, owing to the head in the tank, escapes through the perforations in the pipe, d, and thus sets up a flow in the pipes, c and d. The liquid also flows into the rising "pulse" pipe f, thus producing an increased velocity of flow in the pipes, c and d, over and above that due to the discharge from the perforations or sprays. When the rising liquid in the "pulse" or "momentum" pipe, f, reaches the valve, g, it closes the latter, thus stopping the further rise of the liquid and arresting or retarding the flow in the distributing pipe or pipes. The momentum of the arrested or retarded flow causes momentarily a considerable increase of pressure in the distributing pipe, d, which has the effect of forcing clear any of the nozzles or orifices which may have become partially or wholly choked and also of spraying a certain quantity of the liquid over a more extended area. The rise of the liquid in the "pulse" pipe, f, wholly or partially displaces the air therein and in this form of the apparatus the air is transmitted to the dome, m, by means of the air pipe, h, causing the dome to rise and so close the inlet valve, p. As soon as the inlet valve is closed the liquid head in the "pulse" pipe f, commences to lower, the discharge from the nozzles or perforations then taking effect on the intermediate areas. As the liquid lowers in the pipe, f, the air returns from the dome, m, allowing the latter to fall and the inlet valve, p, to open when the level in the pipe f has fallen to near the bottom thereof. The process above described is then repeated and continues to be repeated as long as liquid is supplied to the tank, a.

Referring now to Fig. 2, the apparatus instead of giving an intermittent action to the inlet valve, p, by the passage of air to and from the pipe, f, by means of an air pipe, is adapted to operate the inlet valve by means of a float, r, working in a vertical stand pipe, s, connected to the delivery pipe, c, at a suitable point below the inlet valve, p. The top of the stand pipe, s, is carried above the liquid level in the tank a. When the inlet valve, p, is open the liquid discharging to the distributing pipe, d, also rises in the stand pipe, s, and on reaching a certain level raises the float, r, which latter by means of the lever, n, closes the inlet valve, p. As soon as this is closed the liquid commences to lower in the stand pipe allowing the float to fall and open the inlet valve again when the level in the pipe f has fallen to near the bottom thereof. It is obvious that by adjusting the area of the stand pipe s, as by a valve, t, at the point where it connects to the pipe, c, the time of filling can be arranged so as to allow the clack valve, g, to close before the float, r, closes the inlet valve, p. When the liquid rises in the pipe, f, the air escapes direct to the atmosphere and when the liquid lowers in the pipe, f, air is drawn in from the atmosphere.

Figure 3:
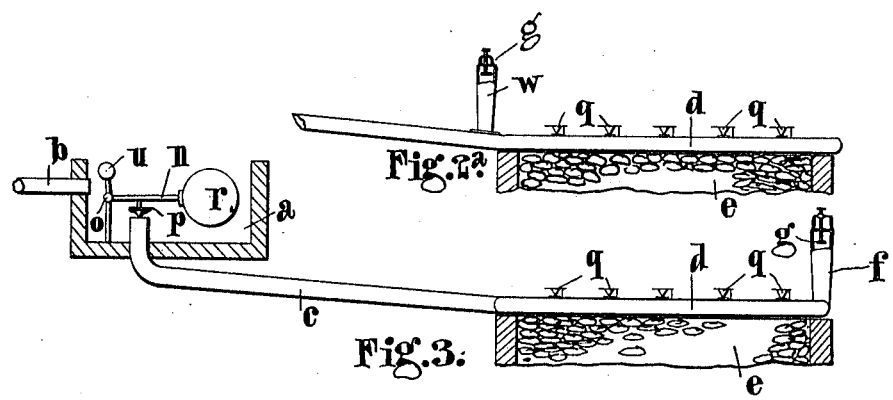
Figure 4:
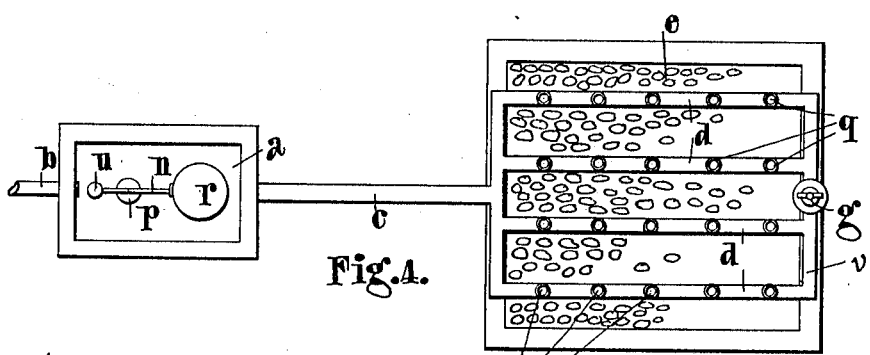

Referring now to Figs. 3 and 4, the float, r, is operated directly by the rise and fall of the liquid in the tank, a. When the liquid therein rises to a certain height the float opens the inlet valve, p, and the liquid level in the receiving tank now commences to lower as the discharge takes place and when the liquid level has fallen to a certain point the float closes the valve, p, which then remains closed until the receiving tank, a, fills again to the height at which the float opens the valve. This modification is particularly applicable to cases where the supply is at times very small as the intermittently acting valve, p, now also functions as a ponding valve. The weight, u, acts as a balance weight to cause a rapid opening and closing of the valve, p.

Although in the apparatus above described with reference to Figs. 1 and 2, the distributing means are shown as a single pipe, d, it is obvious that such means may consist of a plurality of pipes arranged for example in the manner shown in Fig. 4. When a plurality of pipes, d, are used a "pulse" or "momentum" pipe and valve may be arranged at the end of each pipe, d, or a single "pulse" pipe and valve may be arranged in a pipe, v, connecting the ends of the pipes, d, as shown in Fig. 4.

In any of the above described forms of apparatus the "pulse" or "momentum" pipe may be arranged at some intermediate point on the pipes, c and d, instead of at the end especially in cases where the distributing pipes have considerable length. Thus, as shown in Fig. 2ª, the "pulse" pipe may be arranged at w.

Referring now to Fig. 5, the "pulse" pipe, f, is always open to atmosphere at the top end and a clack or like non-return valve, y, is arranged between the pipes, c, and d. The float, r, operates in a stand pipe, s, to control the valve, p, in a similar manner to that described with reference to Fig. 2, a balance weight, u, being employed if desired.

In the operation of this device, upon the opening of the inlet valve, p, the liquid rises in the pipe, f, to a level higher than the static head of the liquid in the tank, a. At the same time the liquid rises in the stand pipe, s, and by means of the float r, closes the valve, p. The momentum of the flowing liquid having been expended by the rise in the pipe f, the liquid is prevented from returning to the tank, a, or the pipes by the non-return valve y. The increased head of liquid is therefore brought to bear on the liquid issuing from the discharge orifices. The level of the liquid in the pipe, f, then falls until the pressure of the liquid in the stand pipe causes the valve, y, to open, which will be when the levels in the pipes s and f are substantially the same, and such liquid also passes to the distributer pipe or pipes. Upon a given fall in the pipe s the float r falls and opens the inlet valve p again and the operation is repeated.

Referring now to Figs. 6 and 7 the former of which is a section on the line 6, 6, of Fig. 7, an apparatus is illustrated in which the "pulse" or "momentum" pipe above described may be dispensed with, the increase of pressure being effected by cutting off the flow to a portion of the distributing pipes. Although not essential, however, I prefer to use "pulse" pipes with this apparatus. The liquid enters the receptacle 2 by way of a delivery pipe 3 where it divides and passes into two "pulse" pipes or vessels 4 and 5. It then flows into the pipes 6 and 7 each leading to a single or plurality of distributing pipes. The lower ends of the "pulse" pipes are adapted to be closed by valves 8 and 9 pivoted at 10 and having arms 11, actuated by levers 12. These levers are connected by rods 13 to floats 14 and 15 and as clearly illustrated the float of each "pulse" pipe controls the valve of the other "pulse" pipe. From the top of the "pulse" pipe 5 a pipe 16 leads to the top of the cistern 17 and is controlled by a cock 18. Similarly the top of the "pulse" pipe 4 connects with a cistern 19 by way of a pipe 20 and cock 21. The cisterns are provided with outlets 22 and 23 situated over the tanks or receptacles 24 and 25 respectively. These receptacles are mounted one on each end of an arm 26 secured to a rod 27 which is adapted to oscillate, and a balance weight 28 may also be secured thereto which tends to retain the oscillating parts in either of their extreme positions. The rod 27 carries the valves controlling the cocks 18 and 21 and in the position of the parts shown in Fig. 6 the cock 18 is open and 21 closed. In the alternate position 21 will be open and 18 closed. 29 and 30 are air inlet or snifting valves situated at tops of the "pulse" pipes and are normally closed by upwardly pressing springs. Means may be provided for varying the size of the outlets 22 and 23 from the cisterns to regulate the time of filling of the receptacles 24 and 25 for purpose which will hereinafter be apparent. The receptacles 24 and 25 are also provided with small outlets 31 and 32 for emptying them or siphons may be used instead. The head of the liquid which enters by pipe 3 is maintained at approximately the level of a plane just below the floats 14 and 15 when in the position shown in Fig. 6.

The operation of this device will now be described. On starting the valves 8 and 9 are both open and it will also be assumed that the other parts are in the positions shown the cock 18 being open. The liquid enters through the pipe 3 and after filling the receptacle 2, the pipes 6, 7, and the distributing pipes, rises under the momentum in the pulse pipe 5, the air in this pipe being allowed to escape through the pipe 16. On reaching the float 15 the liquid raises the same and closes the valve 8 thus cutting off the supply to half the distributing pipes and causing the momentum of the flow thus checked to take effect in raising the pressure in the other half of the distributing pipes and in the "pulse" pipe 5. Any remaining air in the "pulse" pipe 5 together with a quantity of the liquid is now forced through the pipe 16. This liquid is discharged into the cistern 17 from which it passes comparatively slowly into the receptacle 24 and while this filling is taking place the temporary increased pressure falls to the normal pressure i. e. that due to the static head of the liquid entering by pipe 3. The liquid level in the "pulse" pipe 5 therefore falls, air entering through the snifting valve 30, and the float 15 in falling opens the valve 8 again and allows discharge of liquid from all the distributing pipes in the normal way thus producing an increased velocity of flow through the pipe 3 and receptacle 2. The level of the liquid in the pipe 4 will, just prior to said opening of the valve 8, have fallen to or near the level of the distributing pipe orifices air entering through the valve 29, and when the valve 8 is opened the liquid cannot rise at once in pipe 4 owing to the air entrapped therein and having no means of escape. As soon as the receptacle 24 is sufficiently full the weight causes the arm 26 to rock over thus opening the cock 21 and closing 18. This allows the liquid in the "pulse" pipe 4 to rise thus causing a further increase in the velocity of flow in the pipe 3 and its momentum carries it up sufficiently to raise the float 14 and close the valve 9. The increase of pressure due to the arresting of half the flow now takes effect in the other half of the distributing pipes and the operation goes on continuously and automatically on each half in turn. It will be noted that the cisterns 17 and 19 form timing elements which prevent the opening of the cocks 18 and 21 respectively until a period has elapsed during which the valves 8 and 9 are both open and the maximum velocity due to the discharge from all the distributing pipes is attained.

Having now described my invention what I claim as new and desire to secure by Letters Patent is:—

1. Apparatus for distributing sewage or foul effluents, comprising a pipe provided with a plurality of spraying orifices, means for feeding the liquid thereto, and means for utilizing the momentum of the flowing liquid to raise the pressure of discharge from the said orifices to increase the area of distribution and assist in maintaining the orifices clear.

2. Apparatus for distributing sewage or foul effluents, comprising a pipe provided with a plurality of spraying orifices, means for feeding the liquid thereto, means for checking the flow of the liquid, and means for utilizing the momentum of the flowing liquid to raise the pressure of discharge from the said orifices to increase the area of distribution and assist in maintaining the orifices clear.

3. Apparatus for distributing sewage or foul effluents, comprising a pipe provided with a plurality of spraying orifices, means for feeding the liquid thereto, means for automatically and intermittently checking the flow of liquid, and means for utilizing the momentum of the flowing liquid to raise the pressure of discharge from the said orifices to increase the area of distribution and assist in maintaining the orifices clear.

4. Apparatus for distributing liquids comprising an orificed pipe, means for supplying liquid thereto, a vertical pipe adjacent said orificed pipe in which the liquid rises due to its momentum, and produces a pressure greater than that due to the supply head, means for checking the flow of liquid to the orificed pipe, and maintaining the flow of liquid through the orifices by the head in the vertical pipe.

5. Apparatus for distributing liquids comprising an orificed pipe, means for supplying liquid thereto, a vertical pipe adjacent said orificed pipe in which the liquid rises to a greater height than the supply head due to its momentum, means for checking the flow of liquid to the orificed pipe and maintaining the flow of liquid through the orifices by the head in the vertical pipe.

6. Apparatus for distributing liquids comprising an orificed pipe, means for supplying liquid thereto, a vertical pipe adjacent said orificed pipe, a valve on said vertical pipe which is closed on the rise of liquid therein due to the momentum of the liquid, means for checking the flow of liquid to the orificed pipe, and maintaining the flow of liquid through the orifices by the head in the vertical pipe.

7. Apparatus for distributing liquids comprising an orificed pipe, a pipe for normally feeding the liquid thereto under an approximately constant head, a vertical pipe adjacent said orificed pipe, a valve on said vertical pipe which is closed upon the rise of liquid therein due to the momentum of the flowing liquid, and means for closing the feed pipe after said rise takes place.

8. Apparatus for distributing liquids comprising an orificed pipe, a pipe for normally feeding the liquid thereto under an approximately constant head, a vertical pipe arranged at the extreme end of said orificed pipe, a valve on said vertical pipe which is closed upon the rise of liquid therein due to the momentum of the flowing liquid and means for closing the feed pipe after said rise takes place.

9. Apparatus for distributing liquids comprising an orificed pipe, a pipe for normally feeding liquid thereto, under an approximately constant head, a vertical pipe adjacent said orificed pipe and in which the liquid may rise to a greater height than said head, a second vertical pipe arranged on the feed pipe, and means whereby when the liquid rises above a predetermined level in said second vertical pipe, it operates means for closing the feed pipe.

10. Apparatus for distributing liquids comprising a receiving tank, an orificed pipe, a pipe for normally feeding liquid thereto from said receiving tank, a vertical pipe adjacent said orificed pipe, a valve on said vertical pipe which is closed upon the rise of liquid therein due to the momentum of the flowing liquid, a valve for closing the feed pipe inlet, a second vertical pipe on the feed pipe and adjacent the latter valve, a float in said second vertical pipe, and means for closing said feed pipe valve by the rise of said float.

11. Apparatus for distributing liquids comprising a receiving tank, an orificed pipe, a pipe for normally feeding liquid thereto from said receiving tank, a vertical pipe adjacent the said orificed pipe, a valve on said vertical pipe which closes upon the rise of liquid therein due to the momentum of the flowing liquid, a valve for closing the feed pipe inlet, a second vertical pipe on the feed pipe and adjacent the latter valve, means for regulating the inlet to said second vertical pipe from the feed pipe, and means for closing said feed pipe valve upon a rise of liquid in said second vertical pipe.

12. Apparatus for distributing sewage or foul effluents, comprising a pipe provided with a plurality of spraying orifices, means for feeding the liquid thereto, means for allowing the liquid to flow through the feeding means at a greater rate than it escapes from said orifices, and means for utilizing the momentum of the flowing liquid to raise the pressure of discharge from the said orifices to increase the area of distribution and assist in maintaining the orifices clear.

13. Apparatus for distributing liquids comprising a pipe having distributing orifices, a pipe for feeding the liquid thereto, a valve for closing said feed pipe, means for allowing the liquid to flow through the feed pipe at a greater rate than it escapes from said orifices, a vertical pipe adjacent the distributing pipe in which the liquid rises due to its momentum and produces a pressure greater than that due to the supply head, and means for closing said valve after a rise of liquid in said vertical pipe.

14. Apparatus for distributing liquids comprising a receiving tank, a pipe having distributing orifices, a pipe for feeding liquid thereto from said receiving tank, a vertical pipe adjacent said orificed pipe, a valve on said vertical pipe which closes upon the rise of liquid therein due to the momentum of the flowing liquid, a valve for closing the feed pipe inlet, a second vertical pipe on the feed pipe and adjacent the latter valve, and means for closing said feed pipe valve upon a rise of liquid in said second vertical pipe.

In testimony whereof I affix my signature in presence of two witnesses.

ROBERT BARRINGTON BROWN.

Witnesses:
WILLIAM REEVES,
CHARLES G. TAYLOR.

Copies of this patent may be obtained for five cents each, by addressing the "Commissioner of Patents, Washington, D. C."